United States Patent
Patel et al.

(10) Patent No.: US 7,647,426 B2
(45) Date of Patent: Jan. 12, 2010

(54) METHOD AND APPARATUS FOR ACHIEVING BORDER GATEWAY PROTOCOL CONVERGENCE USING ALTERNATE ROUTE INFORMATION

(75) Inventors: Keyur Patel, San Jose, CA (US); Chandrashekhar Appanna, Cupertino, CA (US); John Scudder, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 637 days.

(21) Appl. No.: 11/332,548

(22) Filed: Jan. 12, 2006

(65) Prior Publication Data

US 2007/0162614 A1 Jul. 12, 2007

(51) Int. Cl.
G06F 15/173 (2006.01)
H04L 12/26 (2006.01)
H04L 12/28 (2006.01)

(52) U.S. Cl. .............. 709/239; 709/242; 370/238; 370/252; 370/254; 370/395; 370/401

(58) Field of Classification Search .......... 709/239, 709/243
See application file for complete search history.

(56) References Cited

U.S. PATENT DOCUMENTS

| | | | |
|---|---|---|---|
| 6,714,547 B1 * | 3/2004 | Fujita | 370/395.52 |
| 6,778,502 B2 * | 8/2004 | Ricciulli | 370/238 |
| 7,139,278 B2 * | 11/2006 | Gibson et al. | 370/401 |
| 7,180,864 B2 * | 2/2007 | Basu et al. | 370/238 |
| 7,222,190 B2 * | 5/2007 | Klinker et al. | 709/238 |
| 7,349,994 B2 * | 3/2008 | Balonado et al. | 709/250 |
| 2002/0131362 A1 * | 9/2002 | Callon | 370/216 |
| 2003/0063613 A1 * | 4/2003 | Carpini et al. | 370/401 |
| 2005/0071502 A1 * | 3/2005 | Kamat et al. | 709/239 |
| 2005/0195835 A1 * | 9/2005 | Savage et al. | 370/401 |

OTHER PUBLICATIONS

BGP Route Reflectors, 2003, IP Infusion, p. 1.*
Manav Bhatia, Advertising Equal Cost Multi-Path (ECMP) routes in BGP, May 2003, Samsung Electronics, pp. 1-7.*
RFC 3107—Carrlying Label Information in BGP-4.*
STIC—Search Strategies (Enclosed Herein).*
STIC—Patent Hits (Enclosed Herein).*
STIC—NPL Hits (Enclosed Herein).*
Y. Rekhter et al., "A Border Gateway Protocol 4 (BGP-4)" (RFC 1771), Internet Engineering Task Force, Mar. 1995, pp. 1-54.
T. Bates et al., "Multiprotocol Extensions for BGP-4" (RFC 2858), Internet Engineering Task Force, Jun. 2000, pp. 1-11.

* cited by examiner

*Primary Examiner*—Kevin Bates
*Assistant Examiner*—Andrew Goldberg
(74) *Attorney, Agent, or Firm*—Hickman Palermo Truong & Becker LLP

(57) ABSTRACT

A method of improving BGP convergence in a packet-switched network comprises receiving, at a router in the packet-switched network, an advertisement of a first route that includes alternate route information indicating that an alternate route is available; storing the alternate route information in association with the first route; detecting a change in network reachability of the first route, and in response thereto, determining if the alternate route information is stored for the first route, and if so: awaiting, for a particular time, an advertisement of an alternate route; storing and using the alternate route in place of the first route.

23 Claims, 5 Drawing Sheets

METHOD AND APPARATUS FOR ACHIEVING BORDER GATEWAY PROTOCOL CONVERGENCE USING ALTERNATE ROUTE INFORMATION

FIELD OF THE INVENTION

The present invention generally relates to data processing in computer network routers that use Border Gateway Protocol. The invention relates more specifically to techniques for improving convergence time in BGP networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Routers in packet data networks that use Internet Protocol (IP) and Border Gateway Protocol (BGP) perform a convergence process to resolve routing paths among nodes in the network. The convergence process often requires considerable time to perform in networks that have large numbers of nodes. Network administrators of large networks generally desire to reduce convergence time whenever possible.

Presently, in interior BGP (IBGP) network deployments, an IBGP software module in a router may have information about an alternate route that is feasible and desirable, but the IBGP module may under some circumstances conclude that there is no reachability in subsets of the IBGP domain. This may occur, for example, when IGP reachability to the BGP next hop has been lost. In the event that local but internal reachability changes occur, present operation of IBGP modules can lead to churn in the IBGP networks, which also affects EBGP peers. Such behavior is severely detrimental to networks of Internet Service Providers (ISPs). For example, when ISPs have deployed network-monitoring tools such as Cisco Optimized Edge Routing (OER), ISPs can begin to lose traffic and business revenue because traffic is re-routed incorrectly due to such transient changes. This transient behavior also affects the basic convergence properties of the BGP protocol. Therefore, network administrators desire a solution to address such transients and be able to rapidly arrive at correct reachability information within IBGP domains, and assist in IBGP domains quickly converging to a common understanding of reachability.

Further, administrators of service provider networks would like to constrain all updates that are sent out of their domain of administrative control, which may comprise multiple autonomous systems, to only those updates that represent the final state of connectivity through their network. In present approaches, BGP modules may send update messages that do not reflect the final connectivity state, as a result of limitations in path vector protocols when deployed for intra-domain routing table management.

While solutions to the foregoing issues are needed, any solution must also consider existing network constraints. For example, the amount of available data storage space in provider edge (PE) routers is finite, and any solution that uses an unreasonable amount of storage will be untenable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figures 1A, 1B:
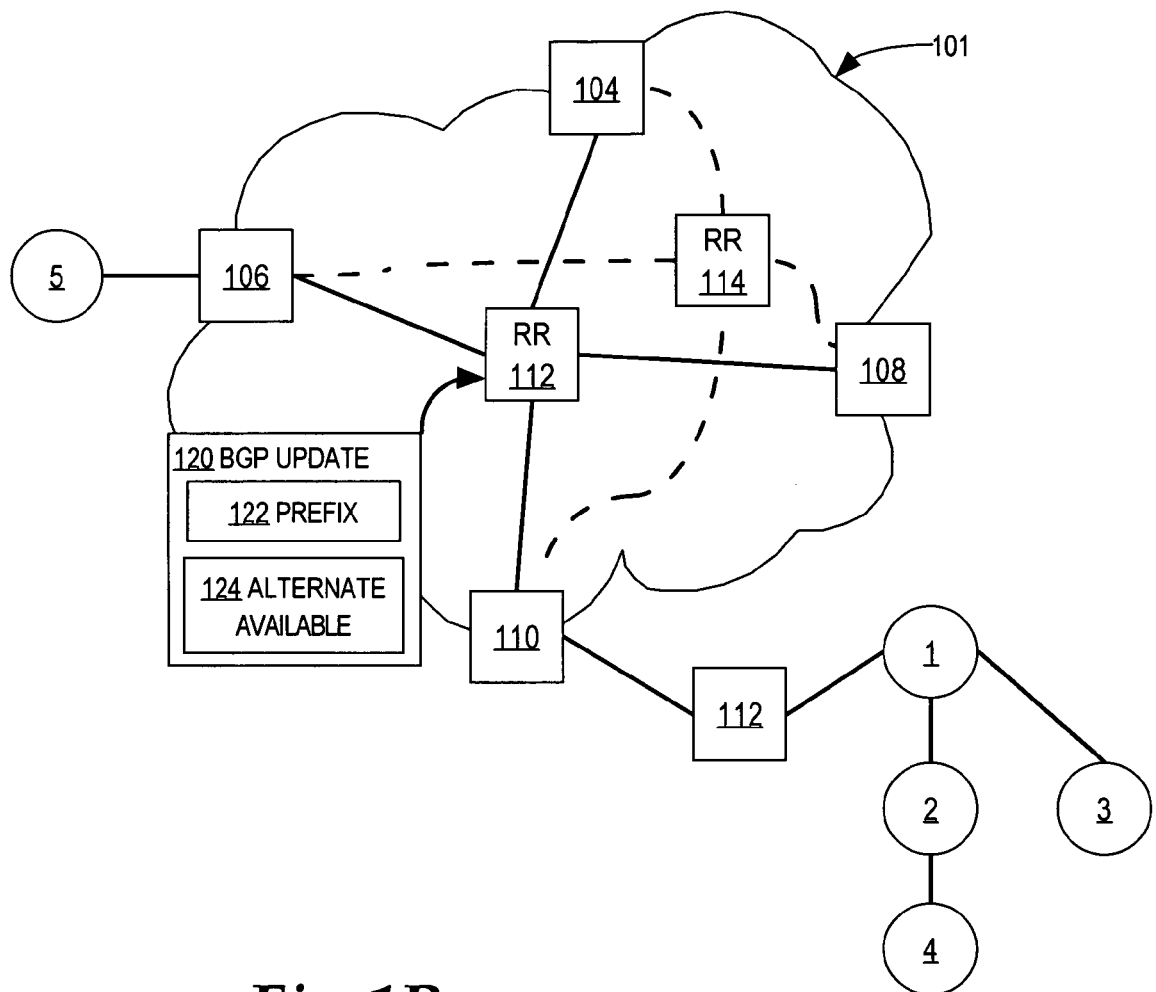
FIG. 1A is a block diagram that illustrates an example network in which an embodiment may be used.
FIG. 1B is a block diagram of an example alternate available attribute.

A method and apparatus for achieving Border Gateway Protocol convergence using alternate route information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Implementation
   3.1 Network Context and Attribute Structure
   3.2 Generating Alternate Available Information at a Route Reflector
   3.3 Using Alternate Available Information at a Router
4.0 Implementation Mechanisms—Hardware Overview
5.0 Extensions and Alternates 1.0 General Overview The needs identified in the foregoing Background, and other needs and objects that will become apparent for the following description, are achieved in the present invention, which comprises, in one aspect, a method, comprising the computer-implemented steps of receiving, at a router in a packet-switched network, an advertisement of a first route that includes alternate route information indicating that an alternate route is available; storing the alternate route information in association with the first route; detecting a change in network reachability of the first route, and in response thereto, determining if the alternate route information is stored for the first route, and if so: awaiting, for a particular time, an advertisement of an alternate route; storing and using the alternate route in place of the first route.

In one feature of this aspect, an unreachability advertisement relating to the first route is sent only when no alternate route information is stored for the first route.

In another feature, a route withdrawal message is sent in response to determining that the alternate route information is stored for the first route. In yet another feature, the first route is received in a Border Gateway Protocol (BGP) UPDATE message. In another feature, a route withdrawal message is sent for the first route if no alternate route is received within the particular time.

In another feature, the first route is received from a BGP route reflector that identifies the first route as a best path for a destination, determines whether an alternate path exists for the first route, and if so, creates and sends a route advertisement message that includes the first route and the alternate route information.

In still another feature a BGP route reflector determines a need to re-advertise the first route, determines that the first route was previously received from a particular BGP peer, and re-advertises the first route in association with second information instructing the particular BGP peer to ignore alternates available.

In another aspect, a method comprises the computer-implemented steps of: at a Border Gateway Protocol (BGP) route reflector in a packet-switched network, identifying a first route as a best path for a destination, determining whether an alternate path exists for the first route, and if so, creating and sending a route advertisement message that includes the first route and alternate route information; at a BGP router that is communicatively coupled to the packet-switched network, receiving the route advertisement message, storing the first route and the alternate route information in a route information base that the BGP router manages, detecting a change in reachability for the first route, and in response thereto, determining if the alternate route information is stored for the first route, and if so: awaiting, for a particular time, an advertisement of an alternate route; storing and using the alternate route in place of the first route; at the BGP route reflector, determining a need to re-advertise the first route, determining that the first route was previously received from a particular BGP peer, and re-advertising the first route in association with second information instructing the particular BGP peer to ignore alternates available.

In other aspects, the invention encompasses a computer apparatus and a computer-readable medium configured to carry out the foregoing steps.

2.0 Structural and Functional Overview

The methods and mechanisms herein generally apply to convergence characteristics of IP networks. In certain embodiments, methods are presented to converge the control plane in IP networks in more deterministic manner than is currently available. One solution described herein provides extra information to each IBGP speaker in an IBGP network, and permits such IBGP speakers to have a better understanding of the reachability capabilities of the entire network. When a change in reachability occurs, the extra knowledge is used to distinguish local transients from actual loss of reachability. The extra information propagated in the network is small, and does not place any significant additional resource burdens on any provider edge (PE) router or route reflector (RR). If a transient condition is detected, a router using the techniques herein waits for the transient to settle down and then advertises the final reachability situation.

In typical IBGP networks, the RR comprises a repository of all reachability information for a portion of a domain. After identifying the best path for each destination, a RR advertises the best path only to its peers. The receiving PE routers only receive information about a single path to a destination; the PE routers do not receive information about alternate paths to the same destination that the RR may currently have. According to an embodiment, a RR notifies peer routers about the availability of alternate paths to destinations. In one embodiment, the RR does not send alternate path values, but only a notification that alternates are available. Accordingly, the methods herein do not substantially increase BGP table storage requirements on PE routers.

In one embodiment, each IBGP speaker recognizes multiple paths to a destination and tracks such reachability by marking the paths with a special marker indicating that alternates are available. Whenever a particular path having alternates available is chosen as a best path, path information for the particular path and information indicating the existence of alternates is sent out to all other internal BGP peers. In an embodiment, a marker value in a path update announcement informs peers of the presence of alternate paths. In one embodiment, the marker value is sent with a best path/reachability BGP UPDATE message and is a specified BGP attribute.

If a BGP speaker has alternate paths but none of the alternates are selected, the BGP speaker still informs peers about the availability of alternate paths to the best path it received. This approach is performed using a BGP UPDATE message with another BGP attribute that defines what processing behavior to perform upon receipt.

Receivers of information indicating availability of alternate paths within an IBGP domain always consider the availability information whenever local changes in reachability occur. If such reachability is present, then no local unreachability is announced to any EBGP speakers, until some information is received from within the IBGP domain. If the received information signals that no more reachability is available through the domain, then unreachability is announced.

Using this approach, multiple successive transient announcements are avoided. The approaches herein provide both a signaling mechanism and rules for signaling the availability of alternate BGP paths, representing transient reachability, present in an IBGP speaker. The signaling mechanism defined herein allows BGP to converge in a more deterministic manner for any reachability information when announcements are made within or without an Autonomous System. For example, explicit withdrawal announcements are generated in a more deterministic manner, thereby avoiding route flaps and avoiding triggering unnecessary BGP dampening.

Embodiments implement data processing rule sets, which are described below in connection with the flow diagrams, which define terms and conditions for signaling alternate path information, thereby ensuring signaling consistency. The approaches herein apply to all IBGP peers that are configured in full mesh, RR topologies and in Confederation topologies.

In one embodiment, new information is carried in BGP prefix announcements. In particular, along with announcements of prefixes and routes within BGP update messages, the approaches herein provide for signaling that "alternates are available" to inform a receiving BGP speaker about the presence of alternate paths to the same prefix or route in the sending BGP speaker's database. Furthermore, receipt of the Alternates available attribute also directs the receiving speaker to not generate a withdrawal message if the route becomes unreachable when a BGP peering session remains established.

3.0 Example Implementation

3.1 Network Context and Attribute Structure

FIG. 1A is a block diagram that illustrates an example network in which an embodiment may be used. A network 101 is typically associated with a service provider and comprises provider edge (PE) routers 104, 106, 108, 110 and route reflectors 112, 114. Each of the route reflectors 112, 114 is coupled in a fully meshed arrangement to the PE routers 104, 106, 108, 110. An end station 5, which may comprise a workstation, personal computer, or other computing device, is coupled to PE router 106. One or more other network nodes 1, 2, 3, 4 in a LAN or internetwork may be coupled to PE router 110 directly or indirectly through one or more other routers 112. Routers 108, 112 also are connected, an arrangement that provides route reflector 112 with an alternate path; for example, route reflector 112 could indicate that while the best path may be through router 110, an alternate is available through router 108.

Each of the PE routers 104, 106, 108, 110 and route reflectors 112, 114 host a BGP module that implements a version of BGP. The PE routers 104, 106, 108, 110 and route reflectors 112, 114 establish BGP peering sessions among themselves for exchanging BGP messages that advertise routes and reachability information.

The arrangement of nodes in FIG. 1A is provided merely as one example context in which an embodiment may be used, and other implementations may use many other network topologies.

According to an embodiment, route reflector 112 sends BGP UPDATE messages 120 that contain one or more prefixes 122 and alternate available attribute 124. In one embodiment, each prefix 122 in a BGP UPDATE message includes a corresponding alternate available attribute 124 that indicates whether the associated prefix has alternate routes available at the RR 112.

FIG. 1B is a block diagram of an example alternate available attribute that may be used, in one embodiment. In the configuration of FIG. 1B, an alternate available attribute 124 may comprise an Alternate Available Prefix Accept flag 126, an Alternate Available Prefix Ignore flag 128, and an Alternate Available Reset flag 130. The use of the elements of available attribute 124 is described further below. Each of the flags 126, 128, 130 may be implemented in any form of data value that may be set or reset.

In one embodiment, when Alternate Available Prefix Accept 126 is set, then the path attributes received with the route should be accepted. Alternate Available Prefix Ignore 128 indicates, when set, that path attributes received with the route should be ignored, and only the "Alternate Available" information should be updated. Alternate available Reset value 130 indicates, when set, that the "Alternate available" information for the route should be cleared.

3.2 Generating Alternate Available Information at a Route Reflector

Figure 2:
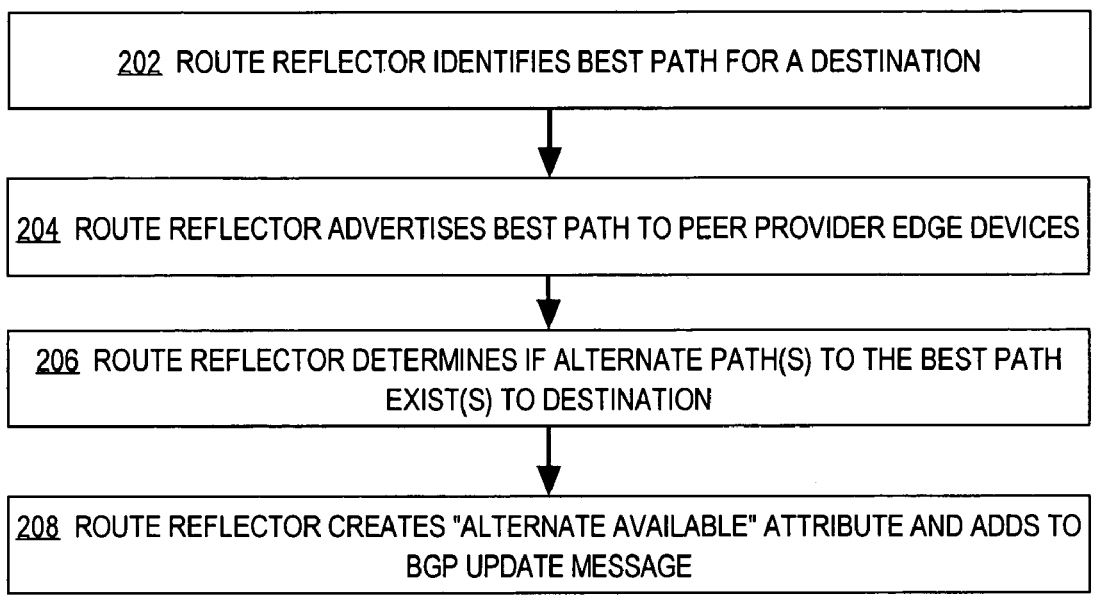
FIG. 2 is a flow diagram that illustrates a high level overview of one embodiment of a method for processing alternate paths.

FIG. 2 is a flow diagram that illustrates a high level overview of one embodiment of a method for processing alternate paths. In step 202, a route reflector identifies a best path for a destination. For example, as part of BGP convergence, RR 112 computes a best path using any appropriate best path algorithm for each prefix stored in the RR's database.

At step 204, the RR advertises the best path to peer routers, such as PE routers. In the example of FIG. 1A, RR 112 has peering sessions with PE routers 104, 106, 108, 110 and therefore RR 112 advertises the best path to those PE routers.

At step 206, the RR determines that one or more alternate paths are available to the destination associated with the best path. In step 208, the RR creates an Alternate available attribute, indicating that alternates are available for the best path, and adds the attribute to a BGP UPDATE message. In step 210, the RR advertises the UPDATE message to its peers, and includes the Alternate available for the best path.

In another embodiment, the RR may perform steps 206, 208 before step 204, so that one advertisement is sent. Alternately, steps 206, 208 are performed at any time after steps 202, 204. Thus, the RR may advertise a best path, and then subsequently discover that alternates are available, e.g., based upon processing UPDATE messages received from peers. At that time, the RR may re-advertise the best path with the Alternate available attribute. Therefore, the specific order of performing the steps of FIG. 2 is not critical; FIG. 2 is intended to reflect the general approach to signal that alternates are available for a prefix, using an attribute in an UPDATE message, at some point after the alternates are known.

3.3 Using Alternate Available Information at a Router

Figure 3:
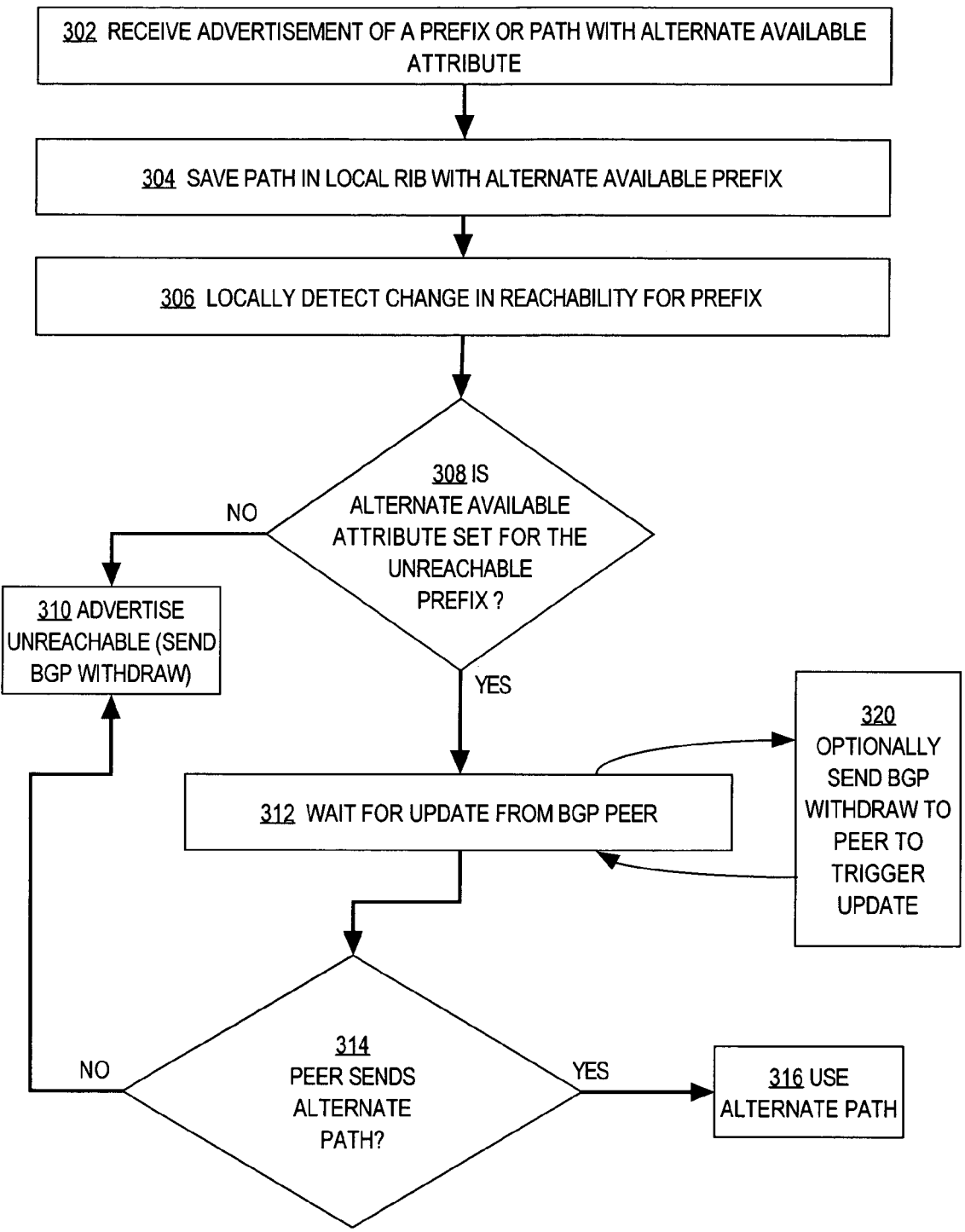
FIG. 3 is a flow diagram that illustrates a high level overview of one embodiment of a method for receiving and processing advertisements of alternate available paths.

FIG. 3 is a flow diagram that illustrates a high level overview of one embodiment of a method for receiving and processing advertisements of alternate available paths. In general, FIG. 3 reflects the following approach, performed in a PE router that runs BGP. If a BGP speaker has AA Prefix Ignore set or AA Prefix Accept set for a given route or prefix that becomes invalid (which may occur, for example, when the nexthop becomes unreachable [a state that is known via igp metrics], such as in cases where the PE router has a prefix that became invalid before the RR sent an implicit update), then the BGP speaker waits for a route update from the peer that signaled the availability of alternate paths. In such cases, BGP speaker also refrains from sending withdrawal message for such routes. In order to trigger an update from the peer that advertised alternates available, the BGP speaker sends a BGP WITHDRAW message to that peer.

Referring now to FIG. 3, in step 302, an advertisement of a prefix or path with an "Alternate available" attribute is received. For example, a PE router receives a prefix from a RR in a BGP UPDATE message in which the Alternate available attribute is set. In step 304, the path is saved in a local routing information base (RIB) with the Alternate available attribute.

At some point thereafter, the router locally detects a change in reachability for a particular prefix, as shown by step 306. At step 308, the router tests whether the Alternate available attribute is set for the unreachable prefix. If not, then no alternate route is available at the route reflector, and the router may immediate advertise that the prefix is unreachable, e.g., by sending a BGP WITHDRAW message, as shown at step 310.

If the Alternate available attribute is set, then the route reflector has alternate paths available for the prefix that has become locally unreachable. Therefore, at step 312, the router waits for one or more updates containing alternate paths to arrive from a BGP peer, such as a route reflector, that originally advertised the unreachable prefix. Step 312 may involve waiting only for a specified or pre-configured interval of time. Optionally, at step 320, a router may send a BGP WITHDRAW message referencing the unreachable route, to trigger the peer to send an UPDATE containing an available alternate.

At step 314, a test is performed to determine if a peer has sent an alternate path within the specified time. If so, then in step 316 the alternate path is added to the RIB and used for future packet routing decisions and packet forwarding. Thus, when a router proceeds along the logical path of steps 306, 308, 312, 314, 316, a technical benefit accrues in that the router does not immediately advertise the unreachable prefix as unreachable. Therefore, if the prefix is only transiently unreachable, unnecessary messages are avoided and upstream routers need not experience route flapping or trigger dampening logic. Instead, the router switches to the alternate path that is obtained from an RR or other peer. In an embodiment, the router temporarily uses the alternate path until the original path again becomes reachable.

If no alternate was received, then the router may advertise the prefix as unreachable, at step 310.

Figure 4:
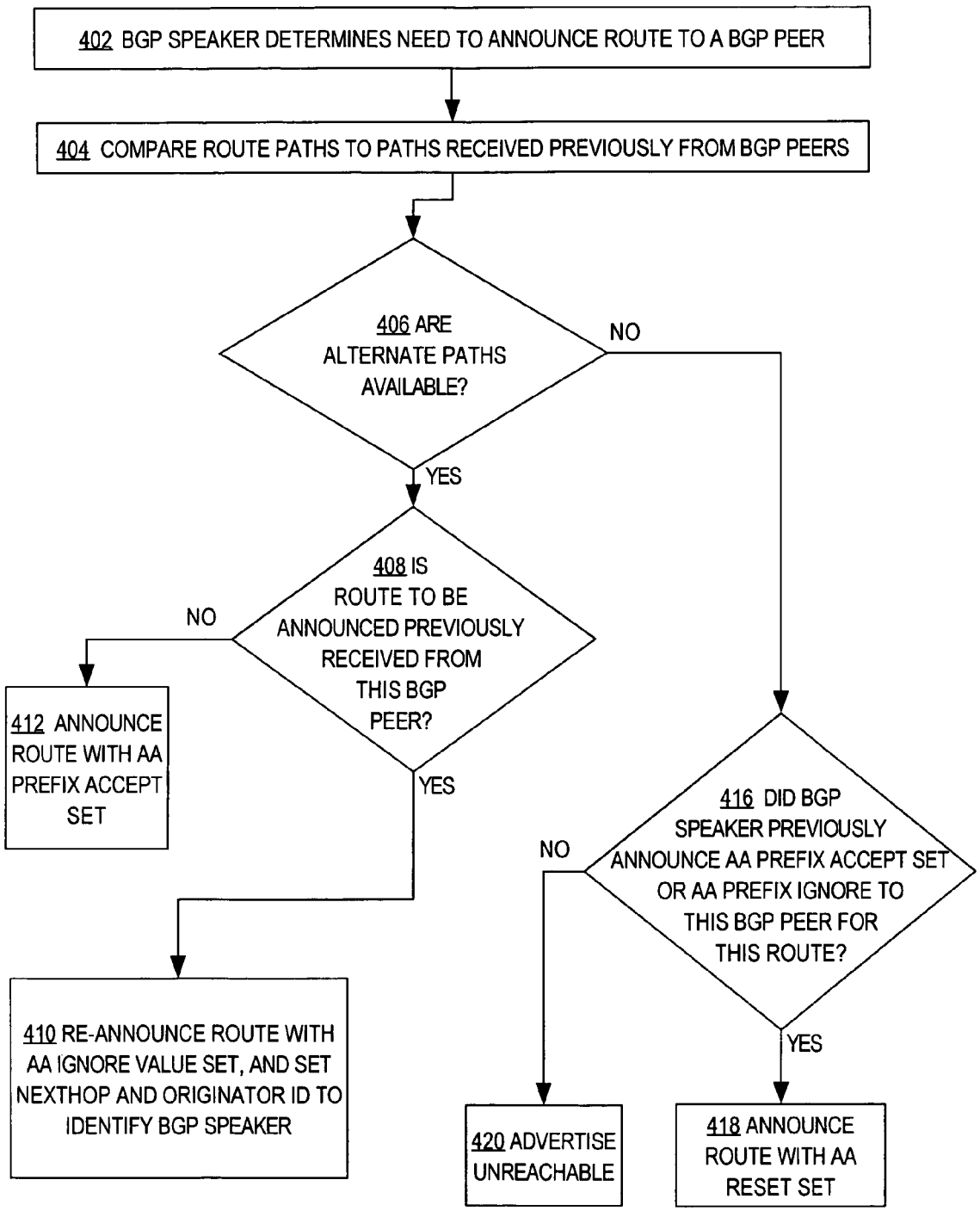
FIG. 4 is a flow diagram that illustrates a high level overview of one embodiment of a method for announcing routes when alternates may be available.

FIG. 4 is a flow diagram that illustrates a high level overview of one embodiment of a method for announcing routes when alternates may be available. In general, FIG. 4 reflects the following approach. Whenever a BGP speaker needs to announce a route to a BGP peer, the BGP speaker compares the route paths with the paths received from the BGP peers. If the BGP speaker has alternate route paths available, then the BGP performs the following actions.

First, if the route announced by the BGP speaker is received from its BGP peer, then the BGP speaker re-announces the route with the AA Prefix Ignore set. The BGP speaker also sets the nexthop attribute and the originator-id attribute of the route to its own router-id value. Second, if the route announced by the BGP speaker is not received from its BGP peer, then the BGP speaker announces the route with the AA Prefix Accept set. If the BGP speaker has announced set values of either the AA Prefix Accept or AA Prefix Ignore field to its BGP peer, and if the BGP speaker no longer has an alternate set of route paths available, then the BGP speaker announces the route with AA Reset set.

Referring now to FIG. 4, in step 402, a BGP speaker determines a need to announce a route to a BGP peer. For example, a BGP speaker receives a prefix from a peer BGP process, and determines a need to advertise the prefix to other peers. In step 404, the router compares route paths to the prefix and available in its RIB to other paths previously received from BGP peers. The comparison of step 404 will identify alternate paths to the prefix that are known to the BGP speaker.

If alternate paths are available, as tested at step 406, then at step 408 the BGP speaker determines whether the route to be announced was previously received from the current BGP peer to whom the new announcement is directed. If not, then in step 412, the route is announced with the Alternates Available Prefix Accept flag set. Thus, the logic of steps 402, 404, 406, 408, 412 results in sending a prefix to a peer with an instruction that alternates are available and the peer should accept and store both the prefix information and the information indicating alternates are available.

If the test of step 408 is positive, then the receiving router is assumed to already know about the prefix that needs to be advertised. Therefore, in step 410, the BGP speaker re-announces the route with the Alternates Available Ignore flag set. This approach informs the receiving router that the prefix information can be ignored because the receiving router is already informed about the prefix, but the Alternates Available attribute should be added to the receiving router's RIB so that the receiving router knows thereafter that alternate paths are available. The BGP speaker also sets the nexthop and originator ID fields to identify itself to the receiving router.

If the test of step 406 was negative, then no alternate paths are available. Control passes to step 416, in which the BGP speaker tests whether it previously announced the prefix with Alternate Available Prefix Accept set or Alternate Available Prefix Ignore set. If so, then in step 418 the BGP speaker announces the route with the Alternate Available Reset flag set, which instructs the receiving router to reset or remove the alternate available information the receiving router is holding for the prefix. This approach essentially informs the receiving router that alternates are no longer available for a previously advertised prefix.

If the test of step 416 is negative, then in step 420, the prefix is advertised as unreachable. Step 420 is appropriate for a prefix that has no alternate paths and was not previously advertised to the receiving router with Alternate Available Prefix Accept set or Alternate Available Prefix Ignore set.

Thus, in one aspect, the approaches herein provide extensions to the BGP protocol to increase information awareness about internal reachability. The approaches provide a method to interpret and work with the new formation to intelligently handle transient behavior in IBGP networks.

Use of the approaches in the various embodiments described herein provides additions to the BGP protocol that can provide significant technical benefits in a network. For example, the approach herein cuts down convergence times in the presence of other internal reachability by at least an order of magnitude. The approach generates implicit/explicit withdrawals in a much more deterministic behavior. The approach assists in avoiding any unnecessary BGP dampening mechanisms, reduces exchange of BGP control information, and assists IBGP to EBGP convergence by not flapping routes across de-militarized zone (DMZ) boundaries.

4.0 Implementation Mechanisms—Hardware Overview

Figure 5:
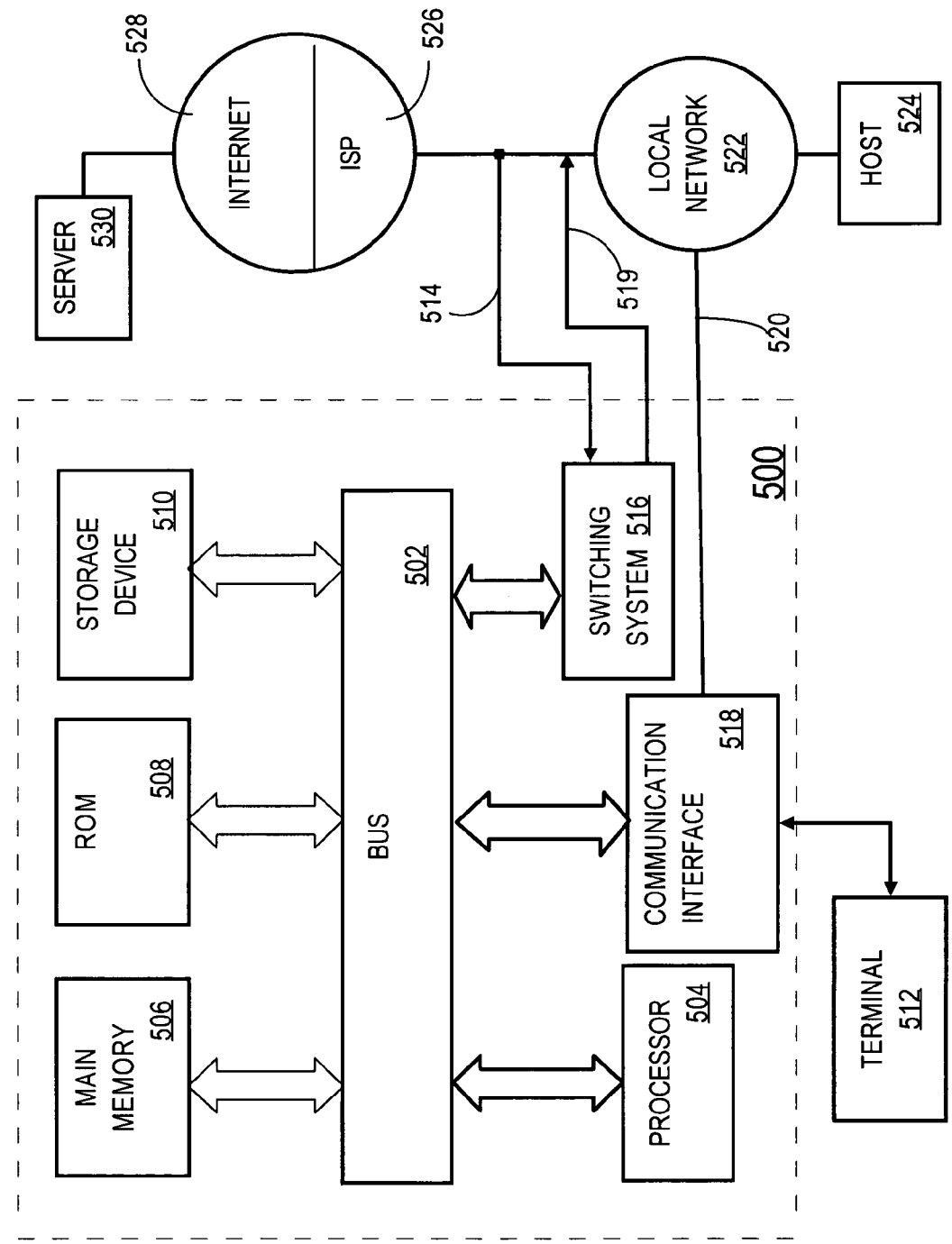
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for achieving Border Gateway Protocol convergence using alternate route information. According to one embodiment of the invention, achieving Border Gateway Protocol convergence using alternate route information is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternate embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for achieving Border Gateway Protocol convergence using alternate route information as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternates

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising computer-implemented steps of:
at a first router in a packet-switched network:
  receiving an advertisement of a first route and a notification indicating that an alternate route is available at a second router;
  storing the notification in association with the first route;
  detecting a change in network reachability of the first route, and in response thereto, determining if the notification is stored for the first route, and if so:
  awaiting, for a particular time, an advertisement comprising the alternate route from the second router without sending a BGP withdrawal message;
  storing and using the alternate route in place of the first route;
  otherwise, initiating by the first router, a request for an alternate route by sending a BGP withdraw message.

2. A method as recited in claim 1, wherein an unreachability advertisement relating to the first route is sent only when no alternate route information is stored for the first route.

3. A method as recited in claim 1, wherein a route withdrawal message is sent in response to determining that the alternate route information is stored for the first route.

4. A method as recited in claim 1, wherein the first route is received in a Border Gateway Protocol (BGP) UPDATE message.

5. A method as recited in claim 1, wherein a route withdrawal message is sent for the first route if no alternate route is received within the particular time.

6. A method as recited in claim 1, wherein the first route is received from a BGP route reflector that identifies the first route as a best path for a destination, determines whether an alternate path exists for the first route, and if so, creates and sends a route advertisement message that includes the first route and the alternate route information.

7. A method as recited in claim 1, wherein a BGP route reflector determines a need to re-advertise the first route, determines that the first route was previously received from a particular BGP peer, and re-advertises the first route in association with second information instructing the particular BGP peer to ignore alternates available.

8. A method, comprising computer-implemented steps of:
at a Border Gateway Protocol (BGP) route reflector in a packet-switched network, identifying a first route as a best path for a destination, determining whether an alternate path exists for the first route, and if so, creating and sending a route advertisement message that includes the first route and a notification indicating that an alternate route is available at a second router;
at a BGP router that is communicatively coupled to the packet-switched network, receiving the route advertisement message, storing the first route and the notification in a route information base that the BGP router manages, detecting a change in reachability for the first route, and in response thereto, determining if the notification is stored for the first route, and if so: awaiting, for a particular time, an advertisement comprising the alternate route from the second router without sending a BGP withdrawal message;
storing and using the alternate route in place of the first route; otherwise, initiating by the BGP router, a request for an alternate route by sending a BGP withdraw message;
at the BGP route reflector, determining a need to re-advertise the first route, determining that the first route was previously received from a particular BGP peer, and re-advertising the first route in association with second information instructing the particular BGP peer to ignore alternates available.

9. An apparatus, comprising:
a Border Gateway Protocol (BGP) route reflector comprising read-write storage configured to store a plurality of route values and a plurality of alternate available route indicators, indicating that an alternate route is available at a second router, in association with corresponding routes;
one or more packet data routers configured as BGP peers of the BGP route reflector and communicatively coupled to the BGP route reflector in one or more BGP peering sessions;
in at least one of the routers, one or more stored sequences of instructions for improving BGP convergence in a packet-switched data network, which instructions, when executed by one or more processors, cause the one or more processors to carry out the steps of:
receiving an advertisement of a first route and a notification-indicating that an alternate route is available at the second router;
storing the notification in association with the first route;
detecting a change in network reachability of the first route, and in response thereto, determining if the notification is stored for the first route, and if so: awaiting, for a particular time, an advertisement comprising the alternate route from the second router without sending a BGP withdrawal message; storing and using the alternate route in place of the first route; otherwise, initiating by the
at least one router, a request for an alternate route by sending a BGP withdraw message.

10. An apparatus as recited in claim 9, wherein an unreachability advertisement relating to the first route is sent only when no alternate route information is stored for the first route.

11. An apparatus as recited in claim 9, wherein a route withdrawal message is sent in response to determining that the alternate route information is stored for the first route.

12. An apparatus as recited in claim 9, wherein the first route is received in a Border Gateway Protocol (BGP) UPDATE message.

13. An apparatus as recited in claim 9, wherein a route withdrawal message is sent for the first route if no alternate route is received within the particular time.

14. An apparatus as recited in claim 9, wherein the first route is received from a BGP route reflector that identifies the first route as a best path for a destination, determines whether an alternate path exists for the first route, and if so, creates and sends a route advertisement message that includes the first route and the alternate route information.

15. An apparatus as recited in claim 9, wherein a BGP route reflector determines a need to re-advertise the first route, determines that the first route was previously received from a particular BGP peer, and re-advertises the first route in association with second information instructing the particular BGP peer to ignore alternates available.

16. An apparatus, comprising:
means for receiving, at a first router in a packet-switched network, an advertisement of a first route and a notification indicating that an alternate route is available at a second router;
means for storing, at the first router, the notification in association with the first route;
means for detecting, at the first router, a change in network reachability of the first route, and in response thereto, determining if the notification is stored for the first route, and if so: for awaiting, for a particular time, an advertisement comprising the alternate route from the second router without sending a BGP withdrawal message; for storing and using the alternate route in place of the first route; otherwise, initiating by the first router, a request for an alternate route by sending a BGP withdraw message.

17. An apparatus as recited in claim 16, wherein an unreachability advertisement relating to the first route is sent only when no alternate route information is stored for the first route.

18. An apparatus as recited in claim 16, wherein a route withdrawal message is sent in response to determining that the alternate route information is stored for the first route.

19. An apparatus as recited in claim 16, wherein the first route is received in a Border Gateway Protocol (BGP) UPDATE message.

20. An apparatus as recited in claim 16, wherein a route withdrawal message is sent for the first route if no alternate route is received within the particular time.

21. An apparatus as recited in claim 16, wherein the first route is received from a BGP route reflector that identifies the first route as a best path for a destination, determines whether an alternate path exists for the first route, and if so, creates and sends a route advertisement message that includes the first route and the alternate route information.

22. An apparatus as recited in claim 16, wherein a BGP route reflector determines a need to re-advertise the first route, determines that the first route was previously received from a particular BGP peer, and re-advertises the first route in association with second information instructing the particular BGP peer to ignore alternates available.

23. An apparatus, comprising:
- means, at a Border Gateway Protocol (BGP) route reflector in a packet-switched network, for identifying a first route as a best path for a destination, determining whether an alternate path exists for the first route, and if so, creating and sending a route advertisement message that includes the first route and a notification indicating that an alternate route is available at a second router;
- means, at a BGP router that is communicatively coupled to the packet-switched network, for receiving the route advertisement message, storing the first route and the notification indicating that the alternate route is available at the second router in a route information base that the BGP router manages, detecting a change in reachability for the first route, and in response thereto, determining if the notification is stored for the first route, and if so: awaiting, for a particular time, an advertisement comprising the alternate route from the second router without sending a BGP withdrawal message; storing and using the alternate route in place of the first route; otherwise, initiating by the BGP router, a request for an alternate route by sending a BGP withdraw message;
- means, at the BGP route reflector, for determining a need to re-advertise the first route, determining that the first route was previously received from a particular BGP peer, and re-advertising the first route in association with second information instructing the particular BGP peer to ignore alternates available.

* * * * *

UNITED STATES PATENT AND TRADEMARK OFFICE
CERTIFICATE OF CORRECTION

PATENT NO. : 7,647,426 B2  Page 1 of 1
APPLICATION NO. : 11/332548
DATED : January 12, 2010
INVENTOR(S) : Keyur Patel, Chandrashekhar Appanna and John Scudder It is certified that error appears in the above-identified patent and that said Letters Patent is hereby corrected as shown below:

In the Claims:

COLUMN 12
At Claim 9: Line 2, between "notification-indicating", delete "-"

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,426 B2 | Page 1 of 1 |
| APPLICATION NO. | : 11/332548 | |
| DATED | : January 12, 2010 | |
| INVENTOR(S) | : Patel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this

Twenty-eighth Day of December, 2010

David J. Kappos
*Director of the United States Patent and Trademark Office*